(12) United States Patent
Almhager et al.

(10) Patent No.: US 11,066,280 B2
(45) Date of Patent: Jul. 20, 2021

(54) CONTAINER CRANE CONTROL SYSTEM

(71) Applicant: ABB Schweiz AG, Baden (CH)

(72) Inventors: Peter Almhager, Köping (SE); Stefan Lindberg, Västerås (SE); Uno Bryfors, Västerås (SE)

(73) Assignee: ABB Schweiz AG, Baden (CH)

( * ) Notice: Subject to any disclaimer, the term of this patent is extended or adjusted under 35 U.S.C. 154(b) by 208 days.

(21) Appl. No.: 15/777,791

(22) PCT Filed: Nov. 9, 2016

(86) PCT No.: PCT/EP2016/077071
§ 371 (c)(1),
(2) Date: May 21, 2018

(87) PCT Pub. No.: WO2017/089133
PCT Pub. Date: Jun. 1, 2017

(65) Prior Publication Data
US 2018/0370774 A1 Dec. 27, 2018

(30) Foreign Application Priority Data
Nov. 23, 2015 (EP) ..................... 15195876

(51) Int. Cl.
*B66C 13/16* (2006.01)
*B66C 13/46* (2006.01)
(Continued)

(52) U.S. Cl.
CPC ............ *B66C 13/16* (2013.01); *B66C 13/085* (2013.01); *B66C 13/40* (2013.01); *B66C 13/46* (2013.01);
(Continued)

(58) Field of Classification Search
CPC ..... B66C 13/46; B66C 19/002; B66C 13/085; B66C 19/007; B66C 13/48; B66C 13/063;
(Continued)

(56) References Cited

U.S. PATENT DOCUMENTS

| 8,477,987 B2 | 7/2013 | Erikkala | |
| 2005/0131574 A1* | 6/2005 | Takehara | ............... G06Q 10/08 700/213 |

(Continued)

FOREIGN PATENT DOCUMENTS

| JP | 2009155056 A | 7/2009 |
| JP | 2012030950 A | 2/2012 |

(Continued)

OTHER PUBLICATIONS

European Search Report Application No. EP 15195876.6 Completed: May 19, 2016; dated May 31, 2016 8 pages.
(Continued)

*Primary Examiner* — Dave Czekaj
*Assistant Examiner* — Samuel D Fereja
(74) *Attorney, Agent, or Firm* — Whitmyer IP Group LLC

(57) ABSTRACT

A container crane control system including: a camera configured to be fixedly mounted to a crane to obtain a series of captured images, a video output configured to provide a video signal including a series of cropped image based on the series of captured images; and a control device configured to, for at least part of the captured images and the respective cropped image, receive an input signal indicating a current height of a load of the crane, wherein the control device is configured to control a position of the respective cropped image within the captured image based on the current height of the load.

17 Claims, 3 Drawing Sheets

(51) Int. Cl.

| | | |
|---|---|---|
| *B66C 19/00* | (2006.01) | |
| *H04N 5/232* | (2006.01) | |
| *B66C 13/08* | (2006.01) | |
| *B66C 13/40* | (2006.01) | |
| *H04N 5/262* | (2006.01) | |
| *H04N 5/445* | (2011.01) | |
| *H04L 29/06* | (2006.01) | |

(52) U.S. Cl.
CPC ....... *B66C 19/007* (2013.01); *H04N 5/23203* (2013.01); *H04N 5/23216* (2013.01); *H04N 5/23296* (2013.01); *H04N 5/2628* (2013.01); *H04N 5/445* (2013.01); *H04L 65/607* (2013.01)

(58) Field of Classification Search
CPC ......... B66C 13/08; B66C 13/22; B66C 1/663; B66C 13/40; B66C 13/04; B66C 13/16; B66C 13/23; B66C 1/101; B66C 11/08; B66C 13/02; B66C 13/12; B66C 15/045; B66C 13/00; B66C 13/18; B66C 15/065; B66C 17/20; B66C 19/00; B66C 23/00; B66C 23/022; B66C 23/16; H04N 7/18; H04N 13/204; H04N 13/279; H04N 5/2252; H04N 5/2257; H04N 5/23203; H04N 5/23216; H04N 5/23296; H04N 5/2628; H04N 5/445; H04N 5/77; H04N 7/188; G06T 2207/30241; G06T 2207/10021; G06T 2207/10028; G06T 2207/30232; G06T 2207/30252; G06T 7/00; G06T 7/292; G06T 7/593; G06T 7/70; G06K 19/06028; G06K 2209/01; G06K 2209/19; G06K 2209/27; G06K 9/00456; G06K 9/00476; G06K 9/00771; G06K 9/00785; G06K 9/00791; G06K 9/033; G06K 9/18; G06K 9/20; G06K 9/22; G06K 9/344; G06K 9/6212; G06K 9/6215

See application file for complete search history.

(56) References Cited

U.S. PATENT DOCUMENTS

| | | | |
|---|---|---|---|
| 2005/0281644 | A1 | 12/2005 | Lussen et al. |
| 2011/0017693 | A1 | 1/2011 | Thomas et al. |
| 2015/0291400 | A1* | 10/2015 | Rintanen ................. B66C 13/46 700/214 |
| 2016/0119589 | A1* | 4/2016 | Tanizumi ................ B66C 13/46 348/144 |
| 2018/0124326 | A1* | 5/2018 | Irie ........................ G06T 7/0004 |

FOREIGN PATENT DOCUMENTS

| | | |
|---|---|---|
| JP | 2013142037 A | 7/2013 |
| JP | 2013159482 A | 8/2013 |
| KR | 20010044401 A | 6/2001 |
| KR | 20060097972 A | 9/2006 |
| WO | 2012161584 A1 | 11/2012 |
| WO | 2015022001 A1 | 2/2015 |

OTHER PUBLICATIONS

International Search Report and Written Opinion of the International Searching Authority Application No. PCT/EP2016/077071 Completed: Feb. 2, 2017; dated Feb. 10, 2017 13 pages.
International Preliminary Report on Patentability and Written Opinion of the International Searching Authority Application No. PCT/EP2016/077071 dated Jun. 7, 2018 9 pages.
Korean Office Action Application No. 10-2018-7014461 Completed: Oct. 1, 2018 4 Pages.
Translated Korean Office Action Application No. 10-2018-7014461 Completed: Oct. 1, 2018 4 Pages.

\* cited by examiner

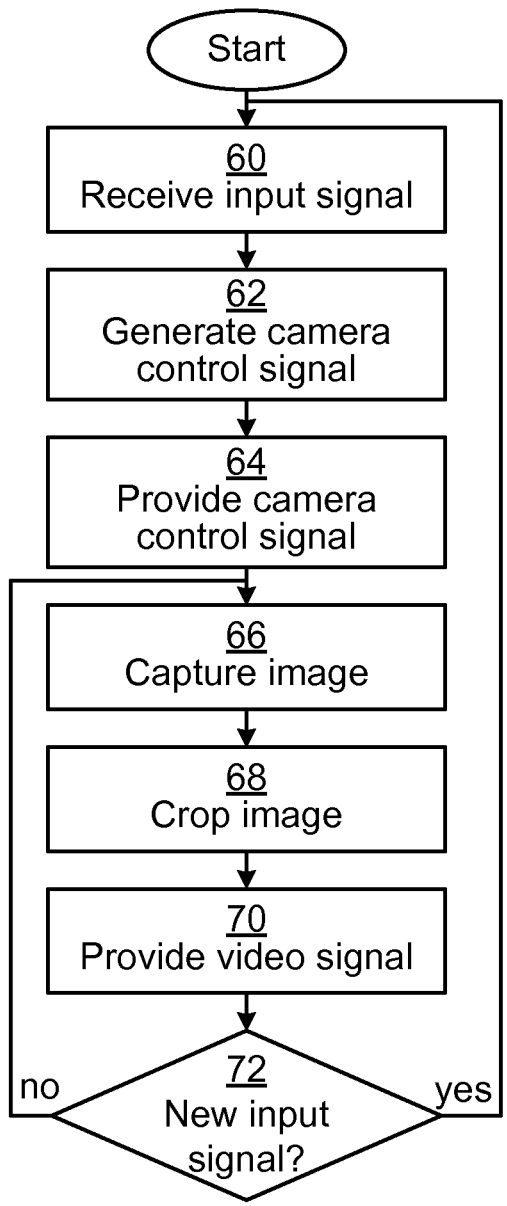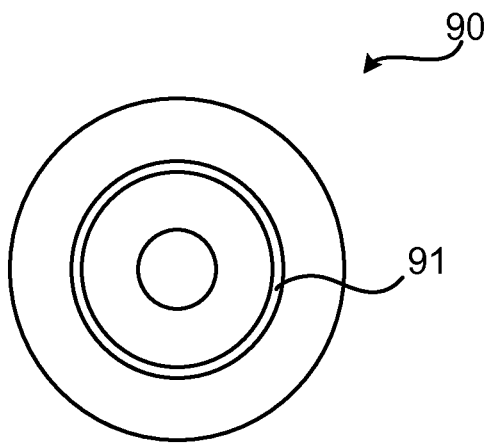
Fig. 5
Fig. 6

CONTAINER CRANE CONTROL SYSTEM

TECHNICAL FIELD

The invention relates to remote control of container cranes.

BACKGROUND

Container cranes are used to handle freight containers, to transfer containers between transport modes at container terminals, freight harbours and the like. Standard shipping containers are used to transport a great and growing volume of freight around the world. Transshipment is a critical function in freight handling. Trans-shipment may occur at each point of transfer and there is usually a tremendous number of containers that must be unloaded, transferred to a temporary stack, and later loaded on to another ship, or back onto the same ship or loaded instead onto another form of transport.

Traditionally, the container cranes have been controlled in an operator cabin mounted on the container crane. Recently however, container cranes have become remote controlled. This allows an operator to sit in an office and control the crane. This has eliminated many situations in which port workers have been exposed to danger and injury. Loading and unloading the ship is seen as a critical stage or a bottleneck in terms of freight handling as the ships are idle in port during the time that loading and/or unloading takes place. To reduce this idle time, the container cranes are normally run continuously on long shifts until the loading or unloading of each ship is completed. By allowing remote control, changeover time for operator changes (due to new shift, breaks, etc.) is greatly reduced.

In order to see how the container and the crane operate, a video feed is provided from a camera by the crane to the office where the operator is located. However, the camera is placed under a large amount of mechanical and environmental stress due to the movement of the crane and the environment of the crane.

WO2015/022001 A1 presents a method for automatically landing a container on a landing target using a container crane. The container crane comprises a trolley and spreader for holding and lifting the container and a crane control system for controlling movements of said container crane. A distance from the container to the landing target is measured and the container is moved towards the landing target dependent on the measured distance. A plurality of images of the landing target are made using at least one camera mounted on the spreader. The images are processed to identify one or more landing features in the images of the landing target. Distances from the container to the landing target are calculated based on a measurement of distance between the container and the landing features in the images.

SUMMARY

It is an object to provide a solution allowing remote control of a container crane where the mechanical stress on the camera is reduced.

According to a first aspect, it is presented a container crane control system comprising: a camera configured to be fixedly mounted to a crane to obtain a series of captured images, a video output configured to provide a video signal comprising a series of cropped image based on the series of captured images; and a control device configured to, for at least part of the captured images and the respective cropped image, receive an input signal indicating a current height of a load of the crane, wherein the control device is configured to control a position of the respective cropped image within the captured image based on the current height of the load.

In this way, the container crane control system can be provided with a fixedly mounted camera. Compared to tiltable cameras, this is a great improvement since mechanical forces applied to the camera and environmental factors (wind, rain, snow, etc.) place enormous requirements on mechanical implementations. Moreover, tiltable cameras are affected by the G forces which occur in this environment, since tiltable cameras need to be able to tilt and thus contain sensitive motors and motor control. With fixedly mounted cameras which are made possible here, there is no need for any moving parts, thus greatly increasing reliability.

The camera may comprise a control signal input and the video output, wherein control signals provided on the control signal input controls the position of each cropped image within the respective captured image. In such a case, the control device is connected to the camera to control the position of the cropped image based on the current height of the load by sending a camera control signal on the control signal input.

The container crane control system may further comprise an operator terminal, being configured to receive the video signal for presentation to an operator and being configured to receive user input for controlling the crane, resulting in a crane control signal for provision to the control device. In such a case, the control device is configured to receive the crane control signal from the operator terminal and to provide corresponding control signals to control crane operation.

The camera may further be responsive to a zoom signal on the control signal input, wherein the zoom signal controls a size of the cropped image compared to the captured image.

The camera may further be responsive to a zoom signal on the control signal input, wherein the zoom signal controls an optical zoom of the camera.

The control device may be configured to send a zoom signal to the camera to zoom in when the height of the load decreases, and to send a zoom signal to the camera to zoom out when the height of the load increases.

The container crane control system may further comprise an encoder being configured to receive the video signal and encode the video signal to a compressed digital video stream for provision to the operator terminal, the encoder being distinct from the camera.

The video signal may comprise a video stream, being a representation of a series of images.

According to a second aspect, it is presented a container crane comprising a spreader, a trolley and a container crane control system according to the first aspect.

According to a third aspect, it is presented a method for controlling video signal output from a fixedly mounted camera of a container crane control system also comprising a control device. The method is performed in the container crane control system and comprises the steps of: receiving an input signal indicating a current height of a load of the crane; capturing an image in the camera, resulting in a captured image;

generating a camera control signal to control a position of a cropped image within a captured image based on the current height of the load; providing the camera control signal to the camera; cropping the captured image based on the input signal, resulting in a cropped image; and providing a video signal comprising the cropped image of the captured image on the video output.

According to a fourth aspect, it is presented a computer program for controlling video signal output from a fixedly mounted camera of a container crane control system also comprising a control device. The computer program comprises computer program code which, when run on a container crane control system causes the container crane control system to: receive an input signal indicating a current height of a load of the crane; capture an image in a camera, resulting in a captured image; generate a camera control signal to control a position of a cropped image within a captured image based on the current height of the load; provide the camera control signal to the camera; crop the captured image based on the input signal, resulting in a cropped image; and provide a video signal comprising the cropped image of the captured image on the video output.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 is a schematic diagram illustrating a method for controlling video signal output from a fixedly mounted camera of a container crane control system according to one embodiment; and FIG. 6 shows one example of a computer program product comprising computer readable means. On this computer readable means a computer

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
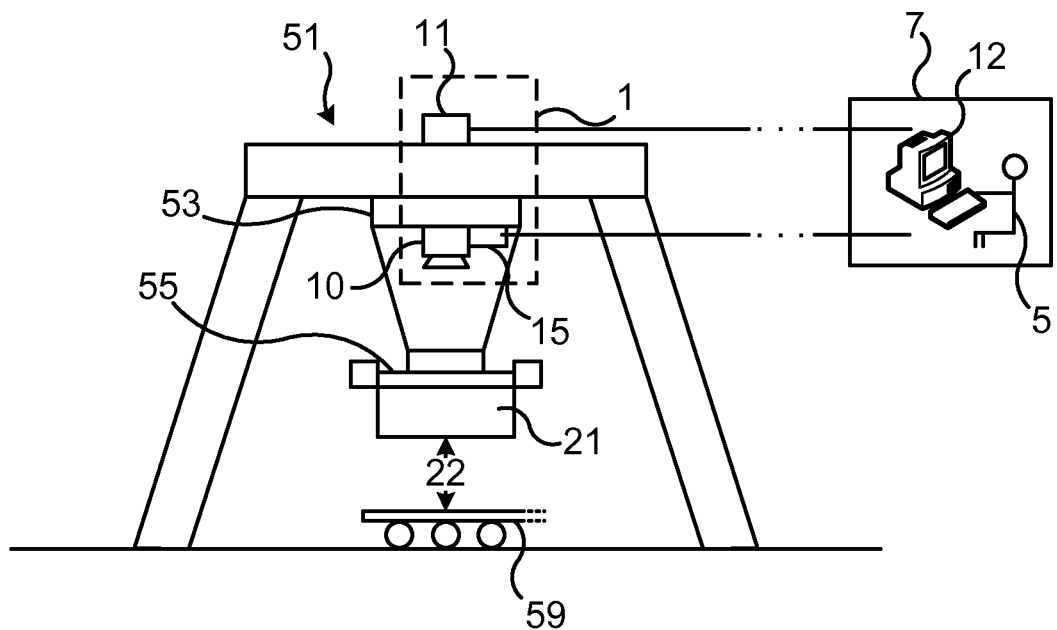
FIG. 1 is a schematic diagram illustrating a container crane environment in which embodiments presented herein can be applied.
Figure 2:
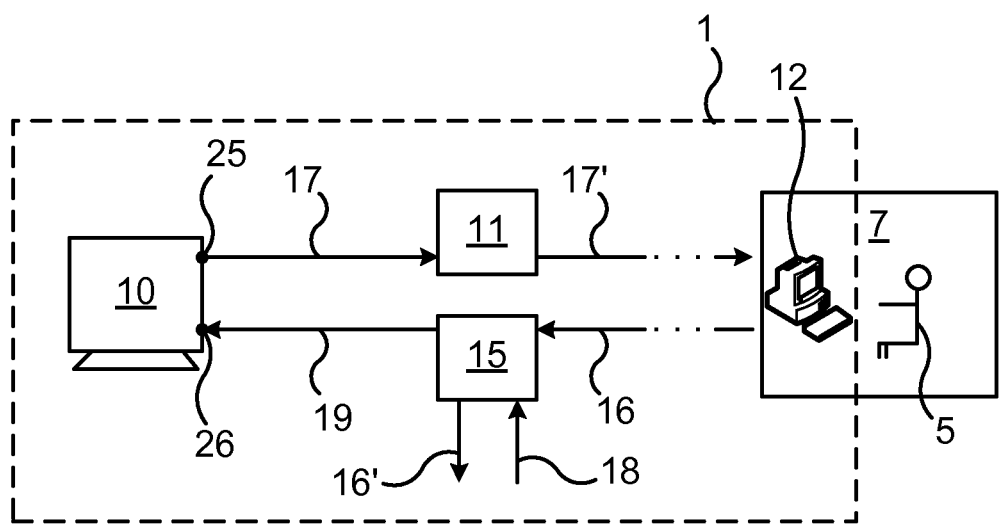
FIG. 2 is a schematic diagram illustrating a container crane control system of FIG. 1 according to one embodiment.

FIG. 1 is a schematic diagram illustrating a container crane environment in which embodiments presented herein can be applied and FIG. 2 is a schematic diagram illustrating a container crane control system of FIG. 1 according to one embodiment. A combined description with references to both FIG. 1 and FIG. 2 will now be presented.

A container crane 51 uses a number of powerful electric motors mounted on a spreader 55 and on a trolley 53 to power moving parts and wind in or let out the wire ropes or cables used to lift up or down the spreader 55 holding a load 21 in the form of a container. Electric motors are also used to power the movements of the trolley 53 holding the spreader 55 to lift and transport the containers out of the ship and onto a truck chassis 59 or a stack etc. on land, or vice versa if loading.

The width of shipping containers is standardised at 8 ft., but the height varies between from 8 and 9.5 ft. The most common standard lengths are 20 ft. and 40 ft. long. The 40 ft. container is very common today and even longer containers up to 53 ft. long are also in use. International standard dimensions are based on a number of ISO recommendations made between 1968 and 1970, and in particular a recommendation R1161 from January 1970 which made recommendations about dimensions of corner fittings for standard containers. It could be said that the distances between corner fittings on standard shipping containers are standardised in accordance with the ISO recommendations. The corner fittings, also known as corner castings, include standard openings so that a container may be picked up by inserting a hook of the spreader 55 into each of the four corner fittings at the top of the container 21. The size and shape of the oval-shaped openings are defined in another standard ISO 1161 from 1984. The same type of corner fittings, e.g. those on the bottom of a container, may be used to lock a container in place in a position (e.g. in a hold or on deck) on board a ship or on a wagon or a chassis.

The spreader 55 is thus used to grip the container 21 using hooks, twistlocks or other fittings to engage with the standard sized opening in the corner fittings on the container, to lift it, lower it and release it. In this description, the term spreader 55 is used to denote a part of a lifting device that is in direct contact with a container 21. Spreaders 55 are normally designed to handle more than one size of container, typically 20-40 ft. or 20-40-45 ft. long containers. A spreader 55 may at any one time lift and handle one single 40 ft. or a 45 ft. container or two 20 ft. containers. Some spreaders 55 are adjustable in use so that the same spreader 55 can be used to pick up one 20 ft., or two 20 ft. containers at a time by adjusting the length of the spreader.

The container crane 51 is thus used e.g. to lift load 21 up from a ship and land it on a chassis 59 or vice versa. Alternatively, the container crane 51 can be used to transfer the container 2 between the ship and ground or a container stack or any other suitable container movement.

A container crane control system 1 is used to control the operation of the crane 51. In order to allow remote control of the crane 51, e.g. from an office 7, the container crane control system 1 comprises a camera 10 and a control device 15. Optionally, the camera 10 and the control device 15 form part of a single combined device.

The camera 10 is a digital camera and comprises a video output 25 for providing a video signal and a control signal input 26. The camera 10 captures images containing at least part of the load 21 and the spreader 55. The video output 25 can be of any suitable type, and can e.g. comprise a video connector for any one of HD-SDI (High Definition Serial Digital Interface), HDMI (High Definition Multimedia Interface, DVI (Digital Video Interface), DisplayPort, etc. The captured images are cropped and these cropped images are provided on a video signal 17 to the video output 25. The video signal 17 is in the form of a video stream, i.e. a digital representation of a series of images (cropped images in this case). The video signal 17 can be a compressed video signal or uncompressed video signal.

Camera control signals provided on the control signal input 26 controls a position of the cropped image within the captured image. The control of the position of the cropped image corresponds to a pan and a tilt of the cropped image, as if the camera 10 were to be physically rotated as a result of the camera control signal. Hence, the camera 10 does not need to be able to tilt or rotate to provide pan and tilt functions, and can thus be fixedly mounted to the crane 51. Compared to rotatable cameras, this is a great improvement since mechanical forces applied to the camera and environmental factors (wind, rain, snow, etc.) place enormous requirements on mechanical implementations. Moreover, tiltable cameras are affected by the G forces which occur in this environment, since tiltable cameras need to be able to tilt and thus contain sensitive motors and motor control. With fixedly mounted cameras which are made possible here, there is no need for any moving parts, thus greatly increasing reliability.

The control device is any suitable control device capable of performing logic operations and can comprise any combination of a central processing unit (CPU), a microcontroller unit (MCU), an application specific integrated circuit (ASIC), a field programmable gate array (FPGA), and discrete logic circuitry, optionally combined with persistent memory (e.g. read only memory, ROM).

The control device 15 receives an input signal 18 indicating a current height 22 of the load 21 of the crane 51. Optionally, the input signal also comprises a container size indicator. The height 22 can be measured as a distance to the chassis 59, or if no chassis 59 is provided, a distance to ground, deck or container stack, whichever is located under the load 21. The control device 15 is connected to the camera 10 to send a camera control signal 19 to control the position of the cropped image based on the current height 22 of the load 21.

In this way, the camera 10 provides a relevant view of the container and spreader 55 to the operator without the need for physical camera rotations for panning or tilting.

An operator terminal 12 can be seen as forming part of the container crane control system 1 and is connected to the camera 10 and the control device 15, e.g. over an IP (Internet Protocol) link, over a wired (e.g. Ethernet) or wireless (e.g. any of the IEEE 802.11 standards) interface. The operator terminal 12 can e.g. be a stationary or laptop computer or any other suitable device configured to receive and present the video signal and to allow user input. The operator terminal 12 is thus configured to receive the video signal for presentation to an operator 5. Moreover, the operator 5, based on the displayed video signal, can provide input to the operator terminal 12 for controlling the crane. This results in a crane control signal 16 for provision to the control device 15. The control device 15 receives the crane control signal 16 from the operator terminal 12 and provides a corresponding control signal 16' to control crane operation, thereby affecting motors of the crane 51, e.g. to lift or lower the container 21 or to move the crane 51.

Figure 4A:
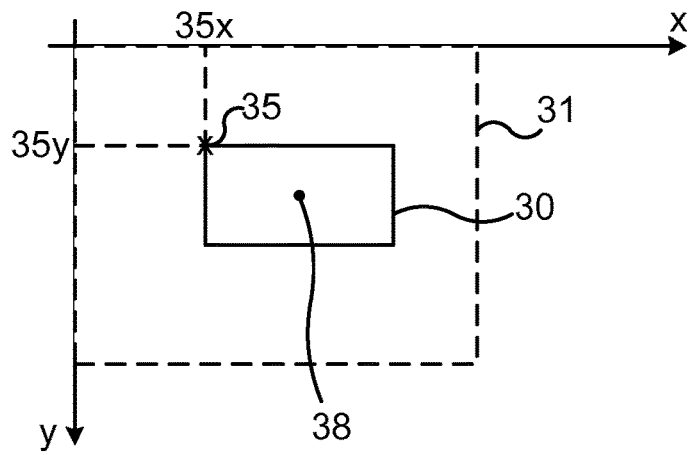
FIGS. 4A-B are schematic diagrams illustrating electronic zoom of the cropped image of FIG. 3.
Figure 4B:
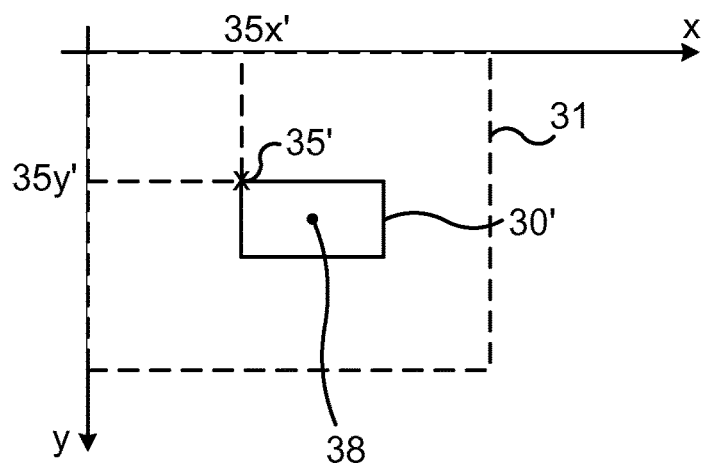

In one embodiment, the camera is responsive to a zoom signal on the control signal input 26, wherein the zoom signal controls a size of the cropped image compared to the captured image, as shown in FIGS. 4A-B and described below. This implements an electronic zoom. Alternatively or additionally, the zoom signal on the control signal input 26 controls an optical zoom of the camera, which can be useful if the resolution of the captured image loses too much detail when zoomed in, which depends on the resolution of the captured image and the amount of electronic zoom which is applied.

The zoom signal can be controlled autonomously by the control device 15. In such a case, the control device 15 sends a zoom signal to the camera 10 to zoom in when the height of the load decreases (i.e. moves further away from the camera 10), and to send a zoom signal to the camera to zoom out when the height of the load increases (i.e. moves towards the camera). Optionally, the autonomously derived zoom can be overridden by the operator 5 using the operator terminal 12.

In order to efficiently encode the video, an encoder 11 is optionally provided. The encoder 11 receives the video signal 17 (e.g. in an HD-SDI format) and encodes the video signal to a compressed digital video stream 17', e.g. H.264. The compressed digital video stream 17' is then provided to the operator terminal 12. By providing the encoder distinct from the camera, a simpler camera can be provided.

It is to be noted that the cropping can occur in the camera 10 as described above or in any other suitable part of the container crane control system 1, such as in the control device 15 or even the encoder 11.

It is to be noted that the input signal can be considered for each cropped image generated based on a captured image. Alternatively, the input signal can be considered only at a certain interval, and cropping cropped images between such input signal considerations is performed with no change, i.e. based on the last known consideration of the input signal.

Figure 3:
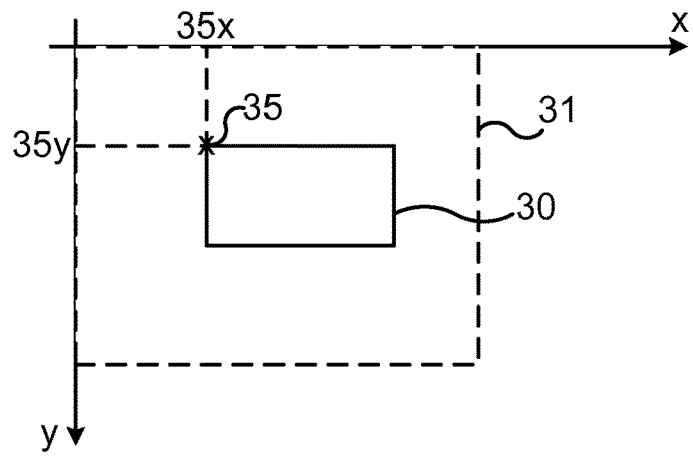
FIG. 3 is a schematic diagram illustrating a cropped image of a captured image.

FIG. 3 is a schematic diagram illustrating a cropped image 30 of a captured image 31. A coordinate system x,y is shown also, where the y axis is positive downwards, as is customary in image processing. However, any suitable coordinate system can be applied.

The cropped image 30 is contained within the captured image at a position 35. The position 35 is here defined to be the top left corner of the cropped image 30; however, the position can be defined to at any suitable predefined location of the cropped image 30. The position 35 is made up of an x coordinate 35x and a y coordinate 35y. When panning, the x-coordinate 35x is changed and when tilting, the y-coordinate 35y is changed.

FIGS. 4A-B are schematic diagrams illustrating electronic zoom of the cropped image of FIG. 3. FIG. 4A illustrates the situation of FIG. 3. FIG. 4B illustrates when a zoom in signal has been provided to the camera to zoom in. In this case, an adjusted cropped image 30' is generated which is smaller than the original cropped image 30. When provided as a full screen image as part of the video stream, this gives the effect of zooming in, implementing an electronic zoom. Optionally, a new position 35' with corresponding coordinates 35x', 35y' is calculated so that a centre 38 of the cropped image 30 remains stationary during the zooming. As explained above, if the resolution and the electronic zoom level of the captured image is not sufficient to provide a cropped image of adequate quality, an optical zoom can be used instead of, or in conjunction with, the electronic zoom.

FIG. 5 is a schematic diagram illustrating a method for controlling video signal output from a fixedly mounted camera of a container crane control system according to one embodiment. As explained above, the container crane control system also comprises a control device.

In a receive input signal step 60, an input signal is received. The input signal indicates a current height of a load of the crane.

In an optional generate camera control signal step 62, a camera control signal is generated. The camera control signal is used to control a position of the cropped image within the captured image based on the current height of the load.

In an optional provide camera control signal step 64, the camera control signal is provided to the camera, from the control device.

In a capture image step 66, an image is captured in the camera, resulting in a captured image.

In a crop image step 68, the captured image is cropped based on the input signal (optionally via the camera control signal), resulting in a cropped image.

In a provide video signal step 70, a video signal comprising the cropped image of the captured image is provided on the video output.

In a conditional new input signal step 72 it is determined whether there is a new input signal available. If this is the case, the method returns to the receive input signal step 60. Otherwise, the method returns to the capture image step 66.

Steps 66, 68 and 70 can be repeated as long as there is no new input signal provided. When a new input signal is provided, the method FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A container crane control system comprising:
   a camera configured to be fixedly mounted to a crane to obtain a series of captured images;
   a video output configured to provide a video signal including a series of cropped image respectively based on the series of captured images; and
   a control device configured to, for at least part of the captured images and the respective cropped image, receive an input signal indicating a current height of a load of the crane, wherein the control device is configured to control a position of the respective cropped image within the captured image based on the current height of the load.

2. The container crane according to claim 1, wherein:
   the camera includes a control signal input and the video output, wherein control signals provided on the control signal input controls the position of each cropped image within the respective captured image; and
   wherein the control device is connected to the camera to control the position of the cropped image based on the current height of the load by sending a camera control signal on the control signal input.

3. The container crane control system according to claim 2, wherein the camera further is responsive to a zoom signal on the control signal input, wherein the zoom signal controls a size of the cropped image compared to the captured image.

4. The container crane control system according to claim 3, wherein the control device is configured to send a zoom signal to the camera to zoom in when the height of the load decreases, and to send a zoom signal to the camera to zoom out when the height of the load increases.

5. The container crane control system according to claim 2, wherein the camera further is responsive to a zoom signal on the control signal input, wherein the zoom signal controls an optical zoom of the camera.

6. The container crane control system according to claim 5, wherein the control device is configured to send a zoom signal to the camera to zoom in when the height of the load decreases, and to send a zoom signal to the camera to zoom out when the height of the load increases.

7. The container crane control system according to claim 2, further including an operator terminal, being configured to receive the video signal for presentation to an operator and being configured to receive user input for controlling the crane, resulting in a crane control signal for provision to the control device;
   wherein the control device is configured to receive the crane control signal from the operator terminal and to provide corresponding control signals to control crane operation.

8. The container crane control system according to claim 2, further including an encoder being configured to receive the video signal and encode the video signal to a compressed digital video stream for provision to the operator terminal, the encoder being distinct from the camera.

9. The container crane control system according to claim 2, wherein the video signal includes a video stream.

10. The container crane control system according to claim 1, further including an operator terminal, being configured to receive the video signal for presentation to an operator and being configured to receive user input for controlling the crane, resulting in a crane control signal for provision to the control device;
    wherein the control device is configured to receive the crane control signal from the operator terminal and to provide corresponding control signals to control crane operation.

11. The container crane control system according to claim 10, wherein the camera further is responsive to a zoom signal on the control signal input, wherein the zoom signal controls a size of the cropped image compared to the captured image.

12. The container crane control system according to claim 10, wherein the camera further is responsive to a zoom signal on the control signal input, wherein the zoom signal controls an optical zoom of the camera.

13. The container crane control system according to claim 1, further including an encoder being configured to receive the video signal and encode the video signal to a compressed digital video stream for provision to the operator terminal, the encoder being distinct from the camera.

14. The container crane control system according to claim 1, wherein the video signal includes a video stream.

15. A container crane including a spreader, a trolley and a container crane control system comprising:
    a camera configured to be fixedly mounted to a crane to obtain a series of captured images;
    a video output configured to provide a video signal including a series of cropped image respectively based on the series of captured images; and a control device configured to, for at least part of the captured images and the respective cropped image, receive an input signal indicating a current height of a load of the crane, wherein the control device is configured to control a position of the respective cropped image within the captured image based on the current height of the load.

16. A method for controlling video signal output from a fixedly mounted camera of a container crane control system which also has a control device, the method being performed in the container crane control system and including the steps of:
  receiving an input signal indicating a current height of a load of the crane;
  capturing an image in the fixedly mounted camera, resulting in a captured image;
  generating a camera control signal to control a position of a cropped image within a captured image based on the current height of the load;
  providing the camera control signal to the fixedly mounted camera;
  cropping the captured image based on the input signal, resulting in a cropped image; and
  providing a video signal having the cropped image of the captured image on the video output.

17. A computer program stored on a non-transitory computer-readable medium, the computer program configured for controlling video signal output from a fixedly mounted camera of a container crane control system which also has a control device, the computer program including computer program code which, when run on a container crane control system, causes the container crane control system to:
  receive an input signal indicating a current height of a load of the crane;
  generate a camera control signal to control a position of a cropped image within a captured image based on the current height of the load;
  provide the camera control signal to the camera;
  capture an image in the camera, resulting in a captured image;
  crop the captured image based on the input signal, resulting in a cropped image; and
  provide a video signal including the cropped image of the captured image on the video output.

* * * * *